Oct. 6, 1959 P. J. H. JANSSEN 2,907,825
ARRANGEMENT FOR USE IN TELEVISION RECEIVERS TO SYNCHRONIZE THE LINE DEFLECTION CIRCUIT
Filed Dec. 17, 1956
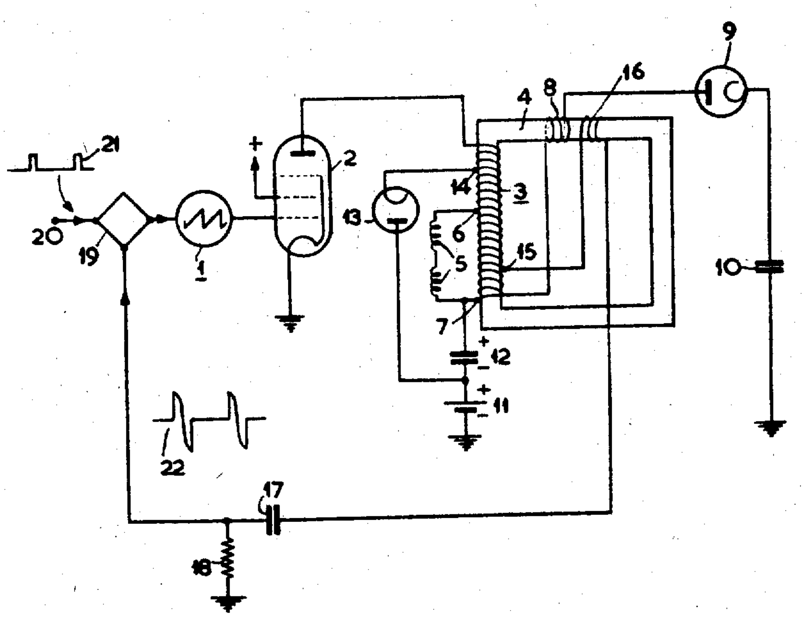
INVENTOR
PETER JOHANNES HUBERTUS JANSSEN
BY Frank R. Jifani
AGENT United States Patent Office 2,907,825

Patented Oct. 6, 1959

2,907,825

ARRANGEMENT FOR USE IN TELEVISION RECEIVERS TO SYNCHRONIZE THE LINE DEFLECTION CIRCUIT

Peter Johannes Hubertus Janssen, Eindhoven, Netherlands, assignor, by mesne assignments, to North American Philips Company, Inc., New York, N.Y., a corporation of Delaware Application December 17, 1956, Serial No. 628,742

Claims priority, application Netherlands January 21, 1956

2 Claims. (Cl. 178—69.5)

The invention relates to an arrangement for use in a television receiver to synchronize the line deflection circuit, in which the line synchronizing pulses and the differentiated fly-back pulses of the line deflection circuit are supplied to a phase comparison stage, the output voltage of which controls the frequency of the line deflection circuit and in which the line deflection circuit includes a transformer, with the primary winding of which are coupled the deflection coils and to the secondary winding of which is connected a rectifying circuit to produce a high direct voltage, the leakage inductance of the transformer being chosen to be such that both at the beginning and at the end of the fly-back the current across the leakage inductance and the derivative of this current are zero.

In such known arrangements the differentiated fly-back pulses and not the fly-back pulses themselves or the integrated fly-back pulses are fed back to the phase comparison stage, since in the case of substantially sinusoidal fly-back voltage pulses a cosine waveform is obtained after differentiation, while outside the period of fly-back the voltage is zero. Therefore the phase comparison stage is less sensitive to interference and the control sensitivity may be enhanced.

The leakage inductance of the transformer in the line deflection circuit and the rectifying circuit are thus chosen in order to avoid interference oscillations in the deflection circuit after the fly-back of the sawtooth current.

It has now been found that with the known combination of measures, i.e. with the use of differentiated fly-back pulses, which are derived from the deflection circuit as described above, irregularities may occur in the synchronization of the deflection circuit.

The arrangement according to the invention mitigates this disadvantage and has the feature that the fly-back pulses to be differentiated are obtained from the series combination of part of the primary winding and a third winding, the latter being coupled more closely with the secondary winding than with the primary winding.

The arrangement according to the invention is based on the following idea.

If the leakage inductance of the transformer is chosen to be such that both at the beginning and at the end of the fly-back the current across the leakage inductance and the derivative of this current are zero, this indeed, results in that during the onward stroke of the deflection current no interference oscillations occur across the deflection circuit, but during the fly-back there occur, in fact, interference oscillations, which, however, for the very reason of their occurrence during the fly-back, do not interfere with the reproduction of the television picture. Upon closer examination these interfering oscillations appeared to be substantially equal to the third harmonic of the fly-back oscillation and to have such a phase during the fly-back that no sinusoidal voltage occurs across the primary winding of the transformer, but a voltage having two maxima and one intermediate minimum. After differentiation of this voltage no cosine voltage occurs, but a voltage which exhibits three zero points during the fly-back period.

It has been found that this interfering oscillation occurs also across the secondary winding, its phase being, however, opposite. Therefore, this unwanted third harmonic may be substantially suppressed by deriving the fly-back pulse from the series combination of part of the primary winding and a third winding, which is coupled more closely with the secondary winding than with the primary winding, since with a correct choice of the sense of winding of the two series-connected windings the wanted sinusoidal oscillations co-operate with one another and the third harmonics counteract one another. With a correct choice of the ratio of the number of turns the third-harmonic components will substantially neutralize one another. This ratio is furthermore determined by the coefficient of coupling of the third winding with the secondary winding.

One embodiment of the arrangement according to the invention will be described more fully with reference to the drawing.

The line deflection circuit comprises a sawtooth oscillator 1 to produce sawtooth voltages, which are fed in known manner to the control-grid of a tube 2. The anode circuit of this tube includes the primary winding 3 of a transformer having a core 4. The line deflection coils 5 are connected between the point 6 and the end 7 of the primary winding 3 remote from the tube. The end 7 is moreover connected to the secondary winding 8 of the transformer, the other end of which is connected to the anode of the rectifier 9. Between the cathode of this diode and earth is connected a capacitor 10, with which the load, for example a cathode-ray tube (not shown) of the receiver is connected in parallel.

Between the joined ends 7 of the windings 3 and 8 and the positive terminal of the anode supply source 11 is connected a capacitor 12. The junction of the source 11 and the capacitor 12 is connected to the anode of the linearizing diode 13, the cathode of which is connected to a tapping 14 of the primary winding 3. A point 15 of the primary winding 3 is connected to one end of a third winding 16 of the transformer, the other end of which is connected to the input circuit of a differentiating network, which consists of a capacitor 17 and a resistor 18. The voltage across the resistor 18 is supplied to a phase comparison stage 19, to which at 20 are supplied the synchronizing pulses 21. In order to ensure a correct operation of the phase comparison stage the resistor 18 should have produced across it a voltage which, during the fly-back of the sawtooth deflection current, has a substantially cosine variation, as is indicated at 22. The direct voltage occurring across the output of the phase comparison stage, the value of which voltage varies with the phase relationship between the synchronizing pulses 21 and the cosine edge of the voltage 22, is supplied to the sawtooth oscillator 1 in order to control the frequency of the deflecting oscillations.

The operation of the deflection circuit is known per se. For completeness sake it should be noted that during the onward stroke of the sawtooth voltage at the control-grid of the tube 2 a sawtooth current flows through the primary winding 3 and the deflection coils 5. When the tube 2 is cut off during the fly-back, the voltage at the anode of the tube 2 and at the anode of the diode 9 coupled with the secondary winding 8 increases, the capacitor 10 being thus charged. After half a period of the fly-back oscillation the diode 13 becomes conductive and the capacitor 12 is charged with the polarity indicated in the drawing, which supports the operation of the battery 11 in the anode circuit of the tube 2.

The leakage inductance between the windings 3 and 8 is chosen to be such that both at the instant of interruption and at the instant of completion of the anode circuit of the tube 2 the current passing through the inductance and the derivative thereof are zero. It is known that this results in that during the onward stroke of the sawtooth current no interfering oscillations occur across the deflectors 5. As stated above, an interfering oscillation does occur during the fly-back, so that the frequency-control of the arrangement is affected adversely, if the input voltage of the differentiating network 17, 18 were derived only from a point, for example point 15, of the primary winding 3. In order to ensure a cosine variation of the voltage 22 during the fly-back, the input voltage of the differentiating network 17, 18 is obtained from the portion 7, 15 of the winding 3 in series with the third winding 16, the sense of winding of these two windings being chosen to be such that the fundamental sine waves of the fly-back voltages across both windings support one another. In this case, the interfering third harmonics in both windings counter-act one another. The winding 16 is coupled more closely with the secondary winding 8 than with the primary winding 3. The ratio of the number of turns of the windings 7, 15 and 16 is to be such that the third harmonics are substantially suppressd, this ratio depending, moreover, slightly upon the position of the winding 16 on the core 4. In practice it was found that the number of turns of the winding 7, 15 was 2 to 4 times that of the turns of the winding 16.

What is claimed is:

1. A television circuit for synchronizing a deflection signal with synchronizing pulses, comprising a deflection circuit for generating said deflection signal and including an output transformer, said transformer comprising a tapped primary winding, a secondary winding connected to a point on said primary winding, and a third winding inductively coupled more tightly to said secondary winding than to said primary winding, means connected to apply said deflection signal to said primary winding, a deflection coil connected to said primary winding, a rectifier connected to said secondary winding, means connecting an end of said third winding to a tap on said primary winding, a differentiation circuit connected to the other end of said third winding, and a phase comparison stage having an output circuit connected to said deflection circuit and having input circuits respectively connected to receive said synchronizing pulses and the output signal from said differentiation circuit.

2. A television circuit for synchronizing a deflection signal with synchronizing pulses, comprising a deflection circuit for generating a deflection signal and including an output transformer, said transformer comprising a primary winding, a secondary winding, said primary and secondary windings being coupled together to a degree providing a leakage reactance between said windings, a tertiary winding coupled more tightly to said secondary winding than to said primary winding, means connected to apply said deflection signal to said primary winding, a deflection coil coupled to said primary winding, a rectifier connected to said secondary winding, means for producing a voltage determined by current flow through said primary winding, means for combining said voltage with a second voltage produced by said tertiary winding thereby to produce a resultant voltage, means responsive to said resultant voltage for producing a phase comparison signal, and means responsive to said phase comparison signal for controlling variations of said deflection signal.

References Cited in the file of this patent

Introduction to Color Television, Admiral Corp., February 1954, page 36.

Color TV, Rider Pub., March 1954, Kaufman & Thomas, pages 141 and 142.